United States Patent
Hui et al.

(10) Patent No.: US 9,030,939 B2
(45) Date of Patent: May 12, 2015

(54) BUILDING ALTERNATE ROUTES IN REACTIVE ROUTING NETWORKS

(75) Inventors: Jonathan W. Hui, Belmont, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 13/524,958

(22) Filed: Jun. 15, 2012

(65) Prior Publication Data

US 2013/0250808 A1     Sep. 26, 2013

Related U.S. Application Data

(60) Provisional application No. 61/614,703, filed on Mar. 23, 2012.

(51) Int. Cl.

| | |
|---|---|
| *H04L 1/00* | (2006.01) |
| *H04L 12/16* | (2006.01) |
| *H04L 12/26* | (2006.01) |
| *H04L 12/28* | (2006.01) |
| *H04W 40/02* | (2009.01) |
| *H04W 40/28* | (2009.01) |

(Continued)

(52) U.S. Cl.
CPC ............ *H04W 40/023* (2013.01); *H04L 45/32* (2013.01); *H04L 45/46* (2013.01); *H04W 40/20* (2013.01); *H04W 40/28* (2013.01)

(58) Field of Classification Search
USPC .................. 370/241–246, 250, 252, 254, 255
See application file for complete search history.

(56) References Cited

U.S. PATENT DOCUMENTS

| | | |
|---|---|---|
| 6,132,306 A | 10/2000 | Trompower |
| 6,732,163 B1 | 5/2004 | Halasz |

(Continued)

FOREIGN PATENT DOCUMENTS

| | | |
|---|---|---|
| EP | 2548342 A1 | 1/2013 |
| WO | WO-2011115679 A1 | 9/2011 |

OTHER PUBLICATIONS

Hari Rangarajana, J.J. Garcia-Luna-Aceves "Efficient use of route requests for loop-free on-demand routing in ad hoc networks" Computer Networks, vol. 51, Issue 6, Apr. 25, 2007, pp. 1515-1529.*

(Continued)

*Primary Examiner* — Xavier Szewai Wong
(74) *Attorney, Agent, or Firm* — Parker Ibrahim & Berg LLC; James M. Behmke; Stephen D. LeBarron

(57) ABSTRACT

In one embodiment, an intermediate node in a computer network may receive one or more reactive routing route requests (RREQs) from an originating node and, based on those RREQs, may build a first directed acyclic graph (DAG) in the computer network that may be rooted at the originating node. The intermediate node may then forward the RREQs towards a target node in the computer network. The intermediate node may then receive one or more reactive routing route responses (RREPs) from the target node. Based on those RREPs, the intermediate node may then build a second DAG in the computer network that may be rooted at the target node. The intermediate node may then forward the RREPs towards the originating node. In this manner, the intermediate node may then forward traffic from the originating node toward the target node according to the second DAG (with alternate routes to the target node).

22 Claims, 13 Drawing Sheets

(51) Int. Cl.
 *H04L 12/721* (2013.01)
 *H04L 12/715* (2013.01)
 *H04W 40/20* (2009.01)

(56) References Cited

U.S. PATENT DOCUMENTS

| | | | |
|---|---|---|---|
| 6,961,323 | B1 | 11/2005 | Xu et al. |
| 7,177,295 | B1 | 2/2007 | Sholander et al. |
| 7,385,988 | B2 | 6/2008 | Asati |
| 7,398,310 | B1 | 7/2008 | Kuehl et al. |
| 7,424,268 | B2 | 9/2008 | Diener et al. |
| 7,515,542 | B2 | 4/2009 | Hertoghs et al. |
| 7,542,414 | B1 | 6/2009 | Katukam |
| 7,606,335 | B2 | 10/2009 | Kloper et al. |
| 7,634,536 | B2 | 12/2009 | Halasz |
| 7,684,411 | B2 | 3/2010 | Asati |
| 7,729,290 | B2 | 6/2010 | Saleh et al. |
| 7,787,361 | B2 | 8/2010 | Rahman et al. |
| 7,826,454 | B2 | 11/2010 | Polk et al. |
| 7,826,463 | B2 | 11/2010 | Patel et al. |
| 7,826,560 | B2 | 11/2010 | Raleigh et al. |
| 7,840,217 | B2 | 11/2010 | Patel et al. |
| 7,848,224 | B2 | 12/2010 | Bryant et al. |
| 7,869,350 | B1 | 1/2011 | Bryant et al. |
| 7,899,027 | B2 | 3/2011 | Castagnoli et al. |
| 7,965,642 | B2 | 6/2011 | Shand et al. |
| 7,978,725 | B2 | 7/2011 | Gong et al. |
| 7,983,174 | B1 | 7/2011 | Monaghan et al. |
| 1,023,157 | A1 | 9/2011 | Vasseur et al. |
| 8,068,411 | B2 | 11/2011 | Vasseur et al. |
| 8,068,840 | B2 | 11/2011 | Patel et al. |
| 8,125,911 | B2 | 2/2012 | Patel et al. |
| 8,179,801 | B2 | 5/2012 | Previdi et al. |
| 8,308,509 | B2 | 11/2012 | Karam |
| 8,363,662 | B2 | 1/2013 | Thubert et al. |
| 8,374,092 | B2 | 2/2013 | Previdi et al. |
| 8,374,164 | B2 | 2/2013 | Nadeau et al. |
| 8,392,541 | B2 | 3/2013 | Agarwal et al. |
| 2003/0204623 | A1 | 10/2003 | Cain |
| 2006/0072602 | A1 | 4/2006 | Achanta |
| 2006/0215583 | A1 | 9/2006 | Castagnoli |
| 2007/0206547 | A1 | 9/2007 | Gong et al. |
| 2008/0062916 | A1* | 3/2008 | Mosko et al. .......... 370/328 |
| 2011/0228696 | A1 | 9/2011 | Agarwal et al. |

OTHER PUBLICATIONS

Clausen, et al., "The LLN On-Demand Ad Hoc Distance-Vector Routing Protocol—Next Generation (LOADng)", IETF Trust, Network Working Group, Internet Draft, draft-clausen-lln-loadng-02, Mar. 2012, 44 pages.

Li, et al., "On-Demand Node-Disjoint Multipath Routing in Wireless Ad Hoc Networks", Proceedings of the 29th Annual IEEE International Conference on Local Computer Networks (LCN'04), IEEE Computer Society, Nov. 2004, pp. 419-420.

Vasseur, et al., "Techniques for Use in Reactive Routing Networks", U.S. Appl. No. 61/614,703, filed Mar. 23, 2012, 66 pages.

Winter; et al., "RPL: IPv6 Routing Protocol for Low-Power and Lossy Networks", Internet Engineering Task Force, Request for Comments 6550, Mar. 2012, 157 pages.

Clausen, et al., "The LLN On-demand Ad hoc Distance-vector Routing Protocol—Next Generation (LOADng)", IETF Trust, Network Working Group, Internet Draft, draft-clausen-lln-loadng-04, Apr. 2012, 50 pages.

Clausen, et al., "The LLN On-demand Ad hoc Distance-vector Routing Protocol—Next Generation (LOADng)", IETF Trust, Network Working Group, Internet Draft, draft-clausen-lln-loadng-05, Jul. 2012, 57 pages.

Sambasivam, et al., "Dynamically Adaptive Multipath Routing Based on AODV", Proceedings of the 3rd Annual Mediterranean Ad hoc Networking Workshop (MedHocNet), Bodrum, Turkey, Jun. 2004, 12 pages.

Sarma, et al., "A Multipath QoS Routing with Route Stability for Mobile Ad Hoc Networks", IETE Technical Review, vol. 27, No. 5, pp. 380-397, Sep. 2010.

Finnie, et al., "Notification of Transmittal of the International Search Report and the Written Opinion of the International Searching Authority, or the Declaration", Patent Cooperation Treaty, International Appl. No. PCT/US2013/033470, mailed Jun. 25, 2013, 12 pages, European Patent Office, Rijswijk, Netherlands.

Haas, et al., "The Zone Routing Protocol (ZRP) for Ad Hoc Networks", Internet Draft, draft-ietf-manet-zone-zrp-03.txt, Mar. 2000, 48 pages, The Internet Engineering Task Force Trust.

Kum, et al., "An Efficient On-Demand Routing Approach with Directional Flooding for Wireless Mesh Networks", Journal of Communications and Networks, vol. 12, No. 1, Feb. 2010, pp. 67-73, Seoul, Korea.

Li, et al., "ABRP: Anchor-Based Routing Protocol for Mobile Ad Hoc Networks", Wireless Personal Communications, vol. 42, No. 2, Aug. 16, 2006, pp. 277-300, Kluwer Academic Publishers.

Ochi, et al., "An Extended AODV Routing for Reduction of Control Messages in Ad Hoc Networks", Consumer Communications and Networking Conference, Jan. 2007, 5 pages, Institute of Electrical and Electronics Engineers.

Pozzi, et al., "Notification of Transmittal of the International Search Report and the Written Opinion of the International Searching Authority, or the Declaration", Patent Cooperation Treaty, International Appl. No. PCT/US2013/033478, mailed Jun. 26, 2013, 12 pages, European Patent Office, Rijswijk, Netherlands.

Singh, et al., "Enhanced AODV Routing Protocol with paging in Heterogeneous IP-Based Networks", Wireless Communications and Networking Conference, Apr. 18, 2010, 6 pages, Institute of Electrical and Electronics Engineers, Piscataway, NJ.

Sucec, et al., "A Query Scope Agent for Flood Search Routing Protocols", Wireless Networks, The Journal of Mobile Communication, vol. 9, No. 6, Nov. 2003, pp. 623-636, Kluwer Academic Publishers, The Netherlands.

* cited by examiner

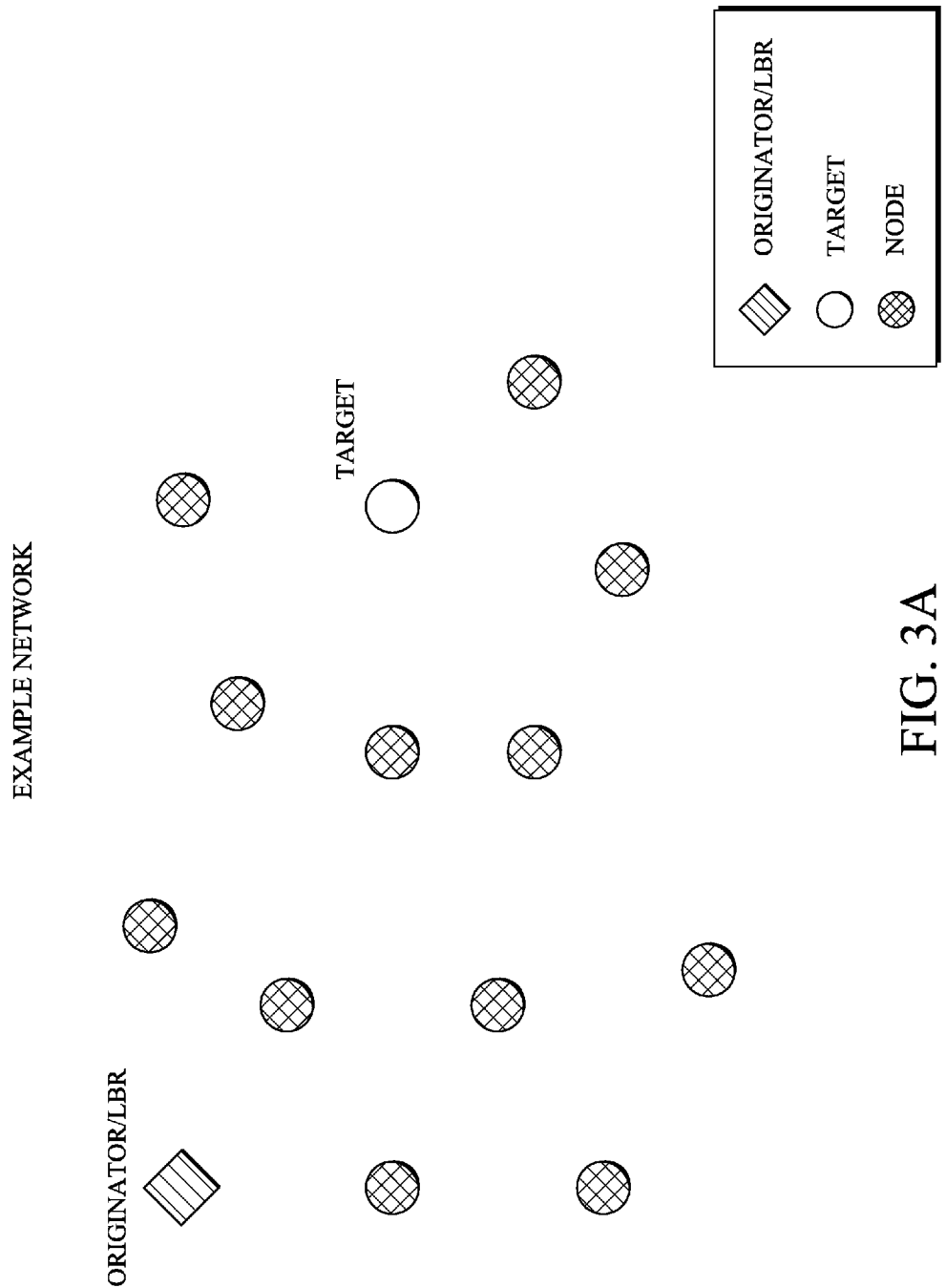

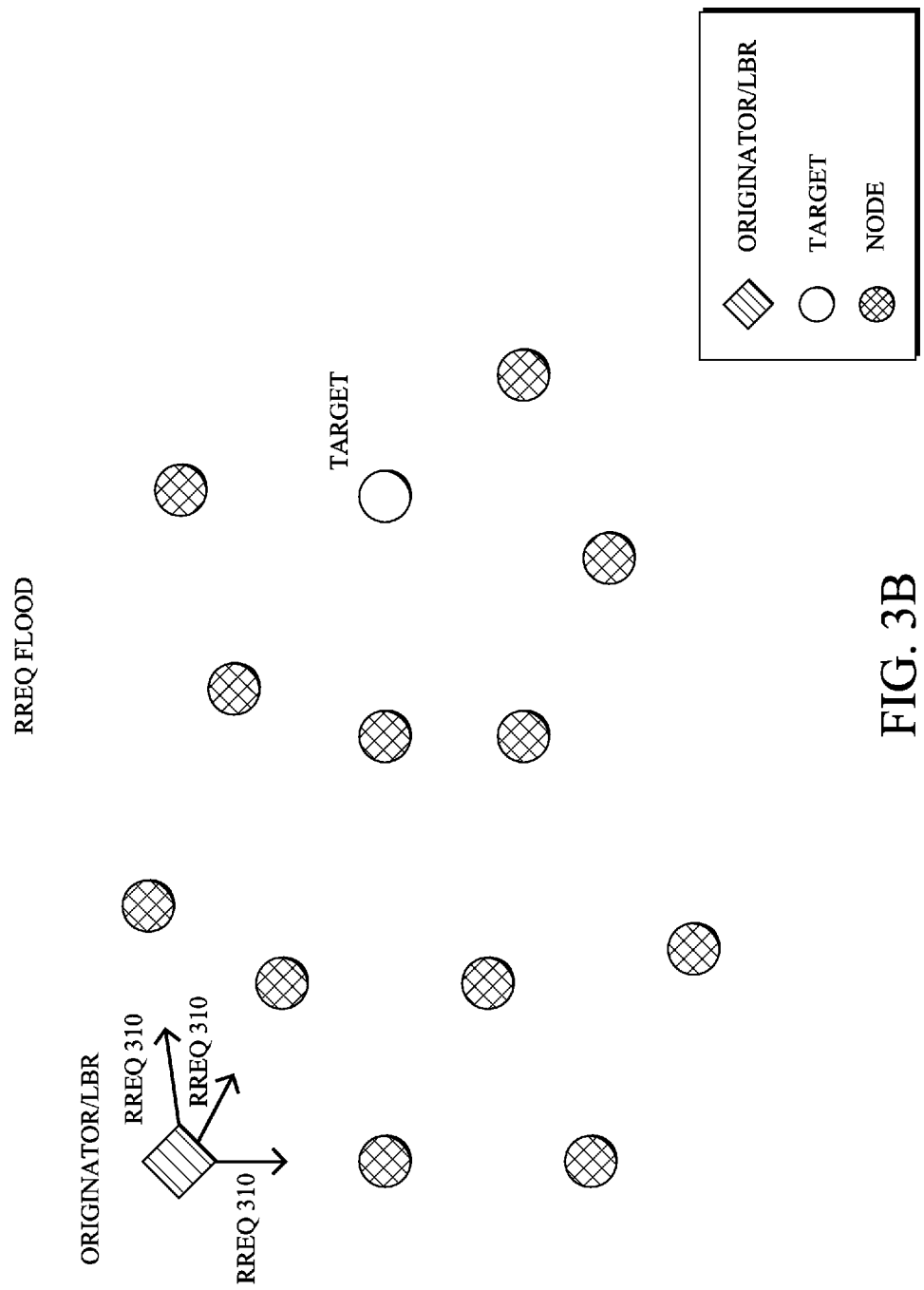

US 9,030,939 B2

BUILDING ALTERNATE ROUTES IN REACTIVE ROUTING NETWORKS

RELATED APPLICATION

The present application claims priority to U.S. Provisional Patent Application Ser. No. 61/614,703, filed Mar. 23, 2012, entitled TECHNIQUES FOR USE IN REACTIVE ROUTING NETWORKS, by Vasseur, et al., the contents of which are hereby incorporated by reference.

TECHNICAL FIELD

The present disclosure relates generally to communication networks, and, more particularly, to reactive routing in communication networks.

BACKGROUND

Low power and Lossy Networks (LLNs), e.g., sensor networks, have a myriad of applications, such as Smart Grid (smart metering), home and building automation, smart cities, etc. Various challenges are presented with LLNs, such as lossy links, low bandwidth, battery operation, low memory and/or processing capability, etc. Routing in LLNs is undoubtedly one of the most critical challenges and a core component of the overall networking solution. Two fundamentally and radically different approaches, each with certain advantages and drawbacks, have been envisioned for routing in LLN/ad-hoc networks known as:

1) Proactive routing: routing topologies are pre-computed by the control plane (e.g., IS-IS, OSPF, RIP, and RPL are proactive routing protocols); and 2) Reactive routing: routes are computed on-the-fly and on-demand by a node that sends a discovery probes throughout the network (e.g., AODV, DYMO, and LOAD are reactive routing protocols), usually driven by user packets to be sent over the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3J illustrate examples of building directed acyclic graphs (DAGs) in a reactive routing network.

DESCRIPTION OF EXAMPLE EMBODIMENTS

Overview

Figure 1:
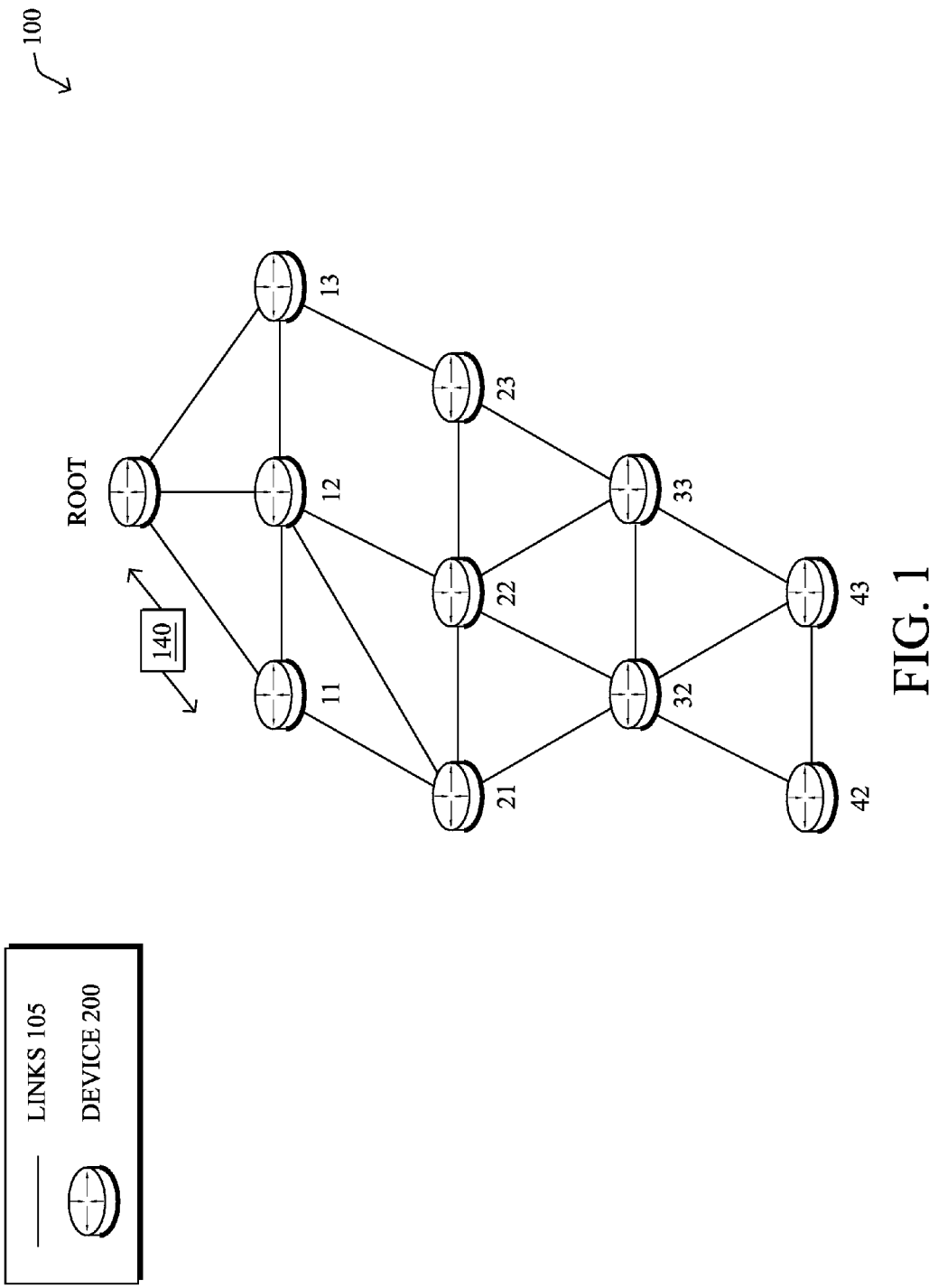
FIG. 1 illustrates an example communication network.

According to one or more embodiments of the disclosure, an intermediate node in a computer network may receive one or more reactive routing route requests (RREQs) from an originating node and, based on those RREQs, may build a first directed acyclic graph (DAG) in the computer network that may be rooted at the originating node. The intermediate node may then forward (flood) the RREQs towards a target node in the computer network. The intermediate node may then receive one or more reactive routing route replies (RREPs) from the target node. Based on those RREPs, the intermediate node may then build a second DAG in the computer network that may be rooted at the target node. The intermediate node may then forward the RREPs towards the originating node. In this manner, the intermediate node may forward traffic from the originating node toward the target node according to the second DAG, where the second DAG provides one or more alternate routes to the target node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "43," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
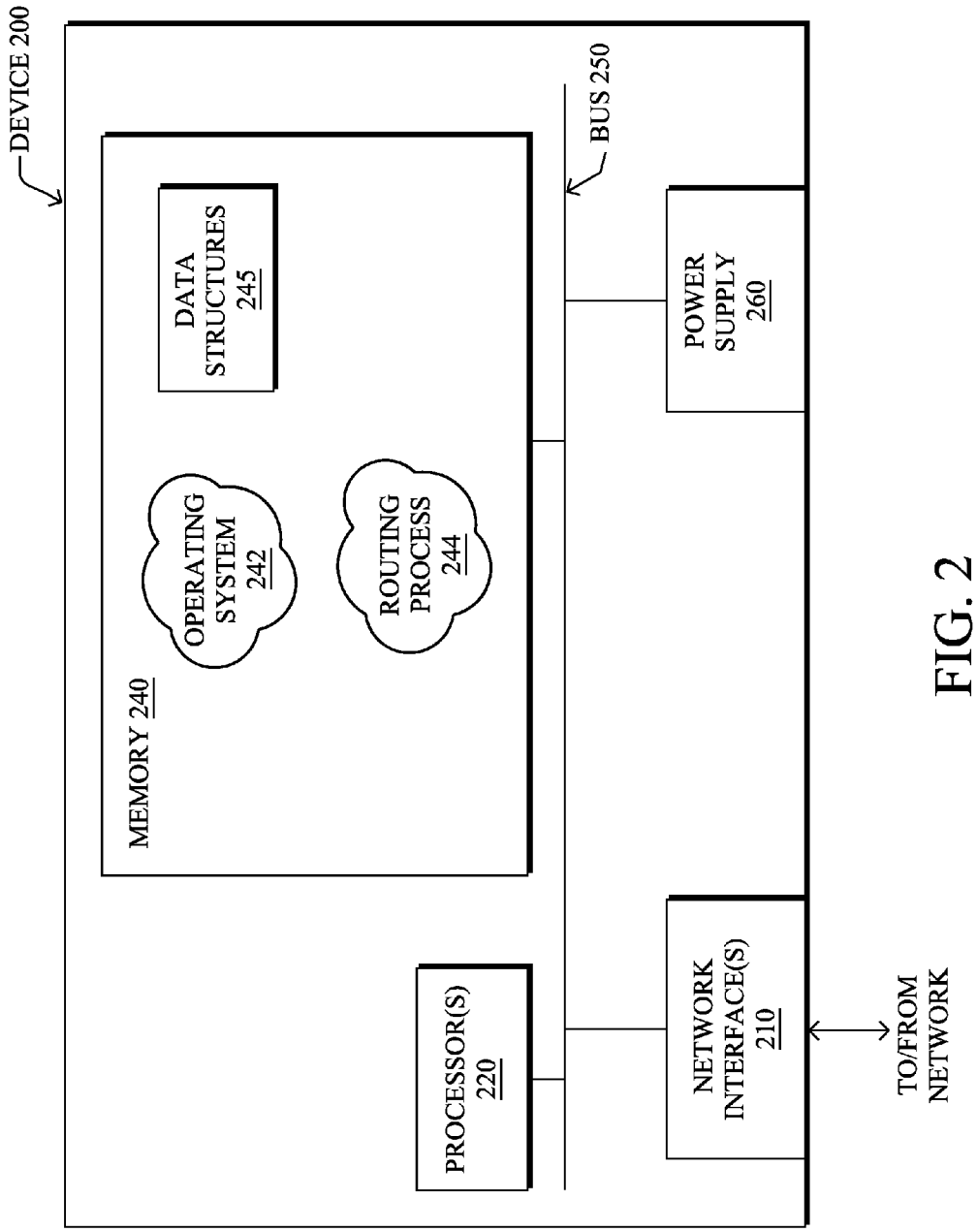
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise an illustrative routing process 244, as described herein. Note that while the routing process 244 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), LLN On-demand Ad hoc Distance-vector (LOAD), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of networks in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

As noted above, routing in LLNs is undoubtedly one of the most critical challenges and a core component of the overall networking solution. Two fundamentally and radically different approaches have been envisioned for routing in LLN/ad-hoc networks known as proactive routing (routing topologies are pre-computed by the control plane) and reactive routing (routes are computed on-the-fly and on-demand by a node that sends a discovery probes throughout the network).

An example proactive routing protocol specified in an Internet Engineering Task Force (IETF) Proposed Standard, Request for Comment (RFC) 6550, entitled "RPL: IPv6. Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL may generally be described as a distance vector routing protocol that builds a Directed Acyclic Graph (DAG) or Destination Oriented Directed Acyclic Graphs (DODAGs) for use in routing traffic/packets 140 from a root using mechanisms that support both local and global repair, in addition to defining a set of features to bound the control traffic, support repair, etc. One or more RPL instances may be built using a combination of metrics and constraints.

An example reactive routing protocol is specified in an IETF Internet Draft, entitled "LLN On-demand Ad hoc Distance-vector Routing Protocol—Next Generation (LOADng) "<draft-clausen-lln-loadng-02> by Clausen, et al. (Mar. 12, 2012 version), provides a reactive routing protocol for LLNs, e.g., as derived from AODV. Other reactive routing protocol efforts include the G3-PLC specification approved by the ITU, and also one described in an informative annex of IEEE P1901.2.

One stated benefit of reactive routing protocols is that their state and communication overhead scales with the number of active sources and destinations in the network. Such protocols only initiate control traffic and establish state when a route to a destination is unknown. In contrast, proactive routing protocols build and maintain routes to all destinations before data packets arrive and incur state and communication overhead that scales with the number of nodes, rather than the number of active sources and destinations. Some believe that reactive routing protocols are well-suited for certain Smart Grid Automated Meter Reading (AMR) applications where a Collection Engine reads each meter one-by-one in round-robin fashion. In such simplistic applications, only one source-destination pair is required at any point in time for a given traffic flow.

Reactive routing protocols, however, have a number of technical issues that are particularly exhibited in large-scale LLNs, such as large utility networks. It is thus important to have a robust solution for reactive routing. Therefore, various techniques are hereinafter shown and described for use with reactive routing networks to address such shortcomings.

Building Alternative Routes

As noted above, reactive routing protocols initiate control traffic (e.g., a Route Request (RREQ) message, a Route Reply (RREP) message, etc.) and establish network/node state when a route from a source to a destination is unknown. For example, a reactive routing protocol may operate by flooding a RREQ message to solicit a RREP from a destination. Nodes/devices that process the RREQ and/or RREP messages may configure a single route towards the node that originated the message. In particular, whenever a node/device receives a RREQ or a RREP message with a larger sequence value or smaller path cost, the node/device may replace its current next-hop for the originator with the node/device that transmitted the RREQ or RREP message. It is important that routing protocols be able to address route failure within a network. In particular, the failure of an inter-node connection (e.g., a route or link) may be handled differently by different reactive routing protocols. For example, AODV, DYMO, and LOAD may attempt to repair the route by sending a Router Error (RERR) message back to the originator, which may then flood the network with another RREQ in order to discover a new route. AODV may also provide a local repair mechanism for a failed inter-node connection by allowing intermediate routers to initiate a RREQ flood to discover an alternative route to the destination. In either case, the inter-node connection failure may be addressed by a RREQ flood to discover a new route, which is an expensive process, especially in large-scale LLNs and may be problematic when nodes are battery operated since flooding is a costly operation.

Efforts to extend reactive routing protocols have focused on the ability to maintain multiple paths towards a RREQ originator by recording multiple potential next-hops towards the RREQ originator for each new RREQ discovery. For example, such multiple paths from the RREQ originator to the RREQ target may be maintained by having the RREQ targets unicast a small number (e.g., 2 or 3) of RREP messages back to the source (i.e., the RREQ originator); however, this approach does not provide for a robust path from the RREQ originator to the RREQ target. Furthermore, the RREQ message is sent using broadcast, which increases bandwidth utilization and network latency. In addition, existing efforts to enable multi-path routing by reactive protocols typically maintain a small handful (e.g., 2 or 3) of diverse paths between a source-destination pair by, for example, recording information in RREQ and RREP messages that indicates whether or not a node has been used previously in a route. The goal of such mechanisms is to establish node-diverse paths. However, when all node-diverse paths fail, the device must then initiate a RREQ flood.

The techniques herein provide a reactive routing protocol that may establish and utilize alternate routes within a reactive routing network, which may reduce or eliminate the need to initiate a RREQ flood in response to a link failure. In particular, the techniques herein allow reactive routing protocols to build separate directed acyclic graphs (DAGs) rooted in an originating node and a target node, respectively, which allow communication between an originating node and a target via alternate routes in the event of link failure within the network.

Specifically, according to one or more embodiments of the disclosure as described in detail below, an intermediate node in a computer network may receive one or more reactive routing route requests (RREQs) from an originating node and, based on those RREQs, build a first directed acyclic graph (DAG) in the computer network that is rooted at the originating node. The intermediate node may then forward (flood) the RREQs towards a target node in the computer network. (Note that flooding is required since the location of the target is usually not known a priori.) The intermediate node may then receive one or more reactive routing route reply (RREP) messages from the target node. Based on those RREPs, the intermediate node may then build a second DAG in the computer network that is rooted at the target node, and forward the RREPs toward the originating node. In this manner, the intermediate node may forward traffic from the originating node toward the target node according to the second DAG, where the second DAG provides one or more alternate routes to the target node.

Illustratively, the techniques described herein may be performed by hardware, software, and/or firmware, such as in accordance with the routing process 244, which may contain computer executable instructions executed by the processor 220 (or independent processor of interfaces 210) to perform functions relating to the novel techniques described herein. For example, the techniques herein may be treated as extensions to conventional routing protocols, such as the various reactive routing protocols, and as such, may be processed by similar components understood in the art that execute those protocols, accordingly.

Operationally, the techniques herein may provide two limited DAGs between a source-destination pair. As described in detail below, a first DAG rooted in an originating node may be formed by broadcasting a reactive routing route request (RREQ) from the originating node, and a second DAG rooted in a target node may be formed by sending a reactive routing route reply (RREP) from the target node. In one embodiment, the second DAG may be formed by multicasting the RREP from the target node to the originating node along the first DAG. In other words, according to this embodiment, the second DAG may be a link-reversal of a subset of the first DAG. In another embodiment, the second DAG may be formed based on the path-cost of specific links within the reactive routing network (i.e., a path-cost technique). According to this embodiment, the RREP may include a Path Search Bound (PSB) field that may guide messages towards a target device without flooding the entire network. It is contemplated within the scope of the disclosure that other routing messages (e.g., RREQs) may comprise such PSB indicators/fields. Since DAGs may be constructed in both directions, the techniques herein may allow each intermediate node/router to have up to "N" alternate routes. This is in contrast to existing reactive routing techniques based on the ability to have "N" diverse paths, where an intermediate router may not have any alternate routes in the event of a link failure.

Notably, the techniques herein allow nodes/devices within a network to establish and utilize alternate routes with a reactive routing protocol that avoids the use of RREQ floods, which may negatively affect the entire network. For example, consider the case in which routes are established in both directions between node A and node B in a network. Node A may initiate the reverse path discovery by sending/flooding a RREQ message, while node B may initiate the forward path discovery by sending a RREP.

According to the techniques herein, a device(s) may maintain multiple next-hop routes to the originating node A, which may be established by the RREQ message. For example, when a device(s) receives an initial RREQ message with a new sequence number, the device(s) may remove any existing routes to node A and establish a new route to node A. When the device(s) receives a new RREQ message with the same sequence number, the device(s) may record up to N additional routes to node A if the path cost advertised in the received message is less than the path cost advertised in the device's own RREQ message, which may allow the device(s) to avoid routing loops. The techniques herein allow a RREQ message to establish a DAG rooted at node A, which provides multiple routes from target node B to node A.

In addition, the techniques herein provide a reactive routing protocol that may use a RREP to establish multiple routes from originating node A to target node B (e.g., while also periodically refreshing the routing state for DAGs rooted at node A and node B). Existing routing protocols such as, for example, AODV, DYMO, and LOAD, unicast a RREP message back to the source, which establishes only a single path from node A to node B. Such routing protocols have been extended to support multiple paths by allowing node B to unicast more than one RREP message back to node A. However, the techniques herein allow the RREP message to be used to build a DAG rooted at node B that may provide multiple routes from node A to node B. But unlike the RREQ message, the DAG rooted at node A may be used to guide the construction of the new DAG rooted at node B. As a result, only devices that may be used to communicate messages from node B to node A may build and maintain the new DAG.

In one embodiment as described herein, target node B may initiate a reply by multicasting a RREP to its "N" next-hop routes towards the source (originating node A). Devices receiving the RREP message may forward the RREP message by multicast to their N next-hop routes, effectively reversing the links of the DAG built by the RREQ message.

In another embodiment as described herein, target node B may compute a Path Search Bound (PSB) by taking the maximum path cost of its N routes to originating node A. When generating a RREP message, node B may include the PSB in the message. Nodes receiving the RREP may only forward the message if they have at least one route to node A that has a route cost less than the PSB. When forwarding the message, the node(s) may insert the maximum path cost of its N routes to node A that is less than the PSB of the received message. Therefore, the PSB may serve as a guide to forward RREP message towards node A.

It is contemplated within the scope of the disclosure that the number of routes "N" to maintain for the DAGs rooted at node A and node B, respectively, may be the same, or different, for each DAG. N may be statically configured or adjusted dynamically. In one embodiment, devices may locally choose their own N based on observed link quality statistics. In another embodiment, the value of N may be included in RREQ and RREP messages based on the network data traffic (e.g., traffic class) and/or observed network conditions. In yet another embodiment, the value of N may be based on local knowledge of "local fate sharing" (i.e., the tendency of certain local nodes to become unreachable simultaneously) in order to provide routes as diverse as possible, thus filtering out the number of options.

The techniques herein further allow the routing state for the DAGs rooted at node A and node B to be periodically refreshed. This is in contrast to existing reactive routing protocols that timeout routing state when they are not actively being used by a node. In other words, existing routing protocols (e.g., AODV, DYMO, and LOAD) refresh a route's lifetime (e.g., routing state) whenever it is used to forward data traffic. However, it is important to note that relying solely on data traffic to maintain the routing state may cause any unused portions of the DAG to timeout, which effectively removes alternative paths in the event of a link failure. In one embodiment, the techniques herein may continue to use data traffic to refresh the DAG routing state; however, rather than always sending the data traffic along the preferred route, devices may spread the traffic across the alternate routes as well. Consequently, the data traffic may continue to use the different routes and refresh their lifetimes.

In another embodiment, the techniques herein may proactively maintain the DAGs rooted at node A and node B while node A and node B are actively sending traffic to each other. During this proactive maintenance mode, node A and node B may use the PSB field to limit the scope of disseminating the RREQ and RREP messages. In other words, while the initial RREQ message may not have a PSB, subsequent RREQ messages used for proactive maintenance may include a PSB. However, according to the techniques herein, all RREP messages may include the PSB.

According to the disclosure, only actively used routes (preferred and/or alternative) may be maintained. Subsequent RREQ messages may be guided to node B, and therefore do not flood the entire network. Situations in which the subsequent RREQ messages do not trigger a RREP messages in reply may therefore indicate that the network topology has changed too drastically for the guided RREQ message to reach node B. In this case, node A may revert to using a RREP that does not include the PSB.

Figure 3C:
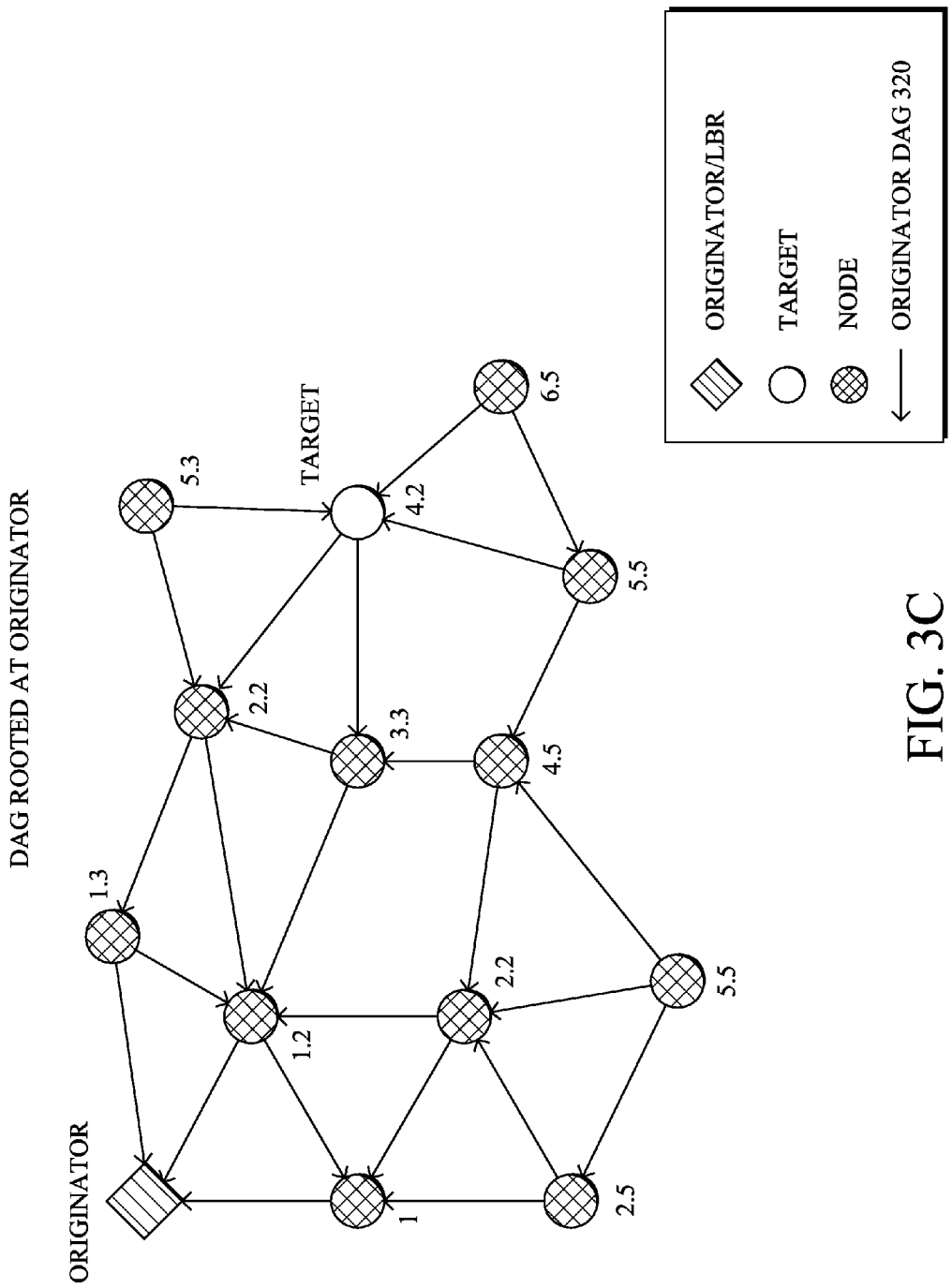

FIGS. 3A-3J illustrate examples of the techniques herein. In particular, FIG. 3A illustrates an example network with an originating node or "Originator" (e.g., the root/LBR) and a target node or "Target". As shown in FIG. 3B, the Originator may flood the network with a RREQ 310, which may then establish a DAG 320 rooted at the Originator, as shown in FIG. 3C.

Figure 3D:
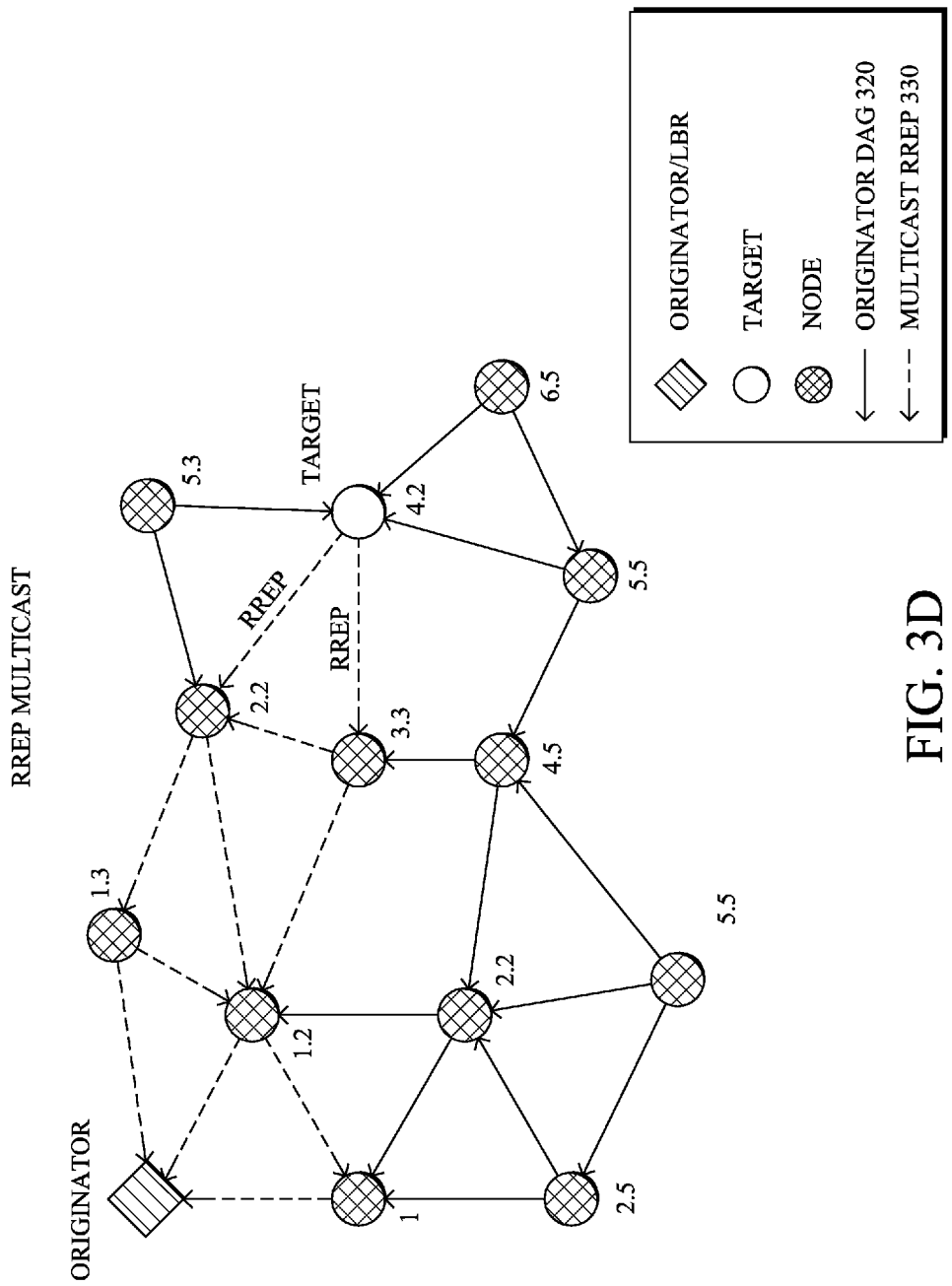
Figure 3E:
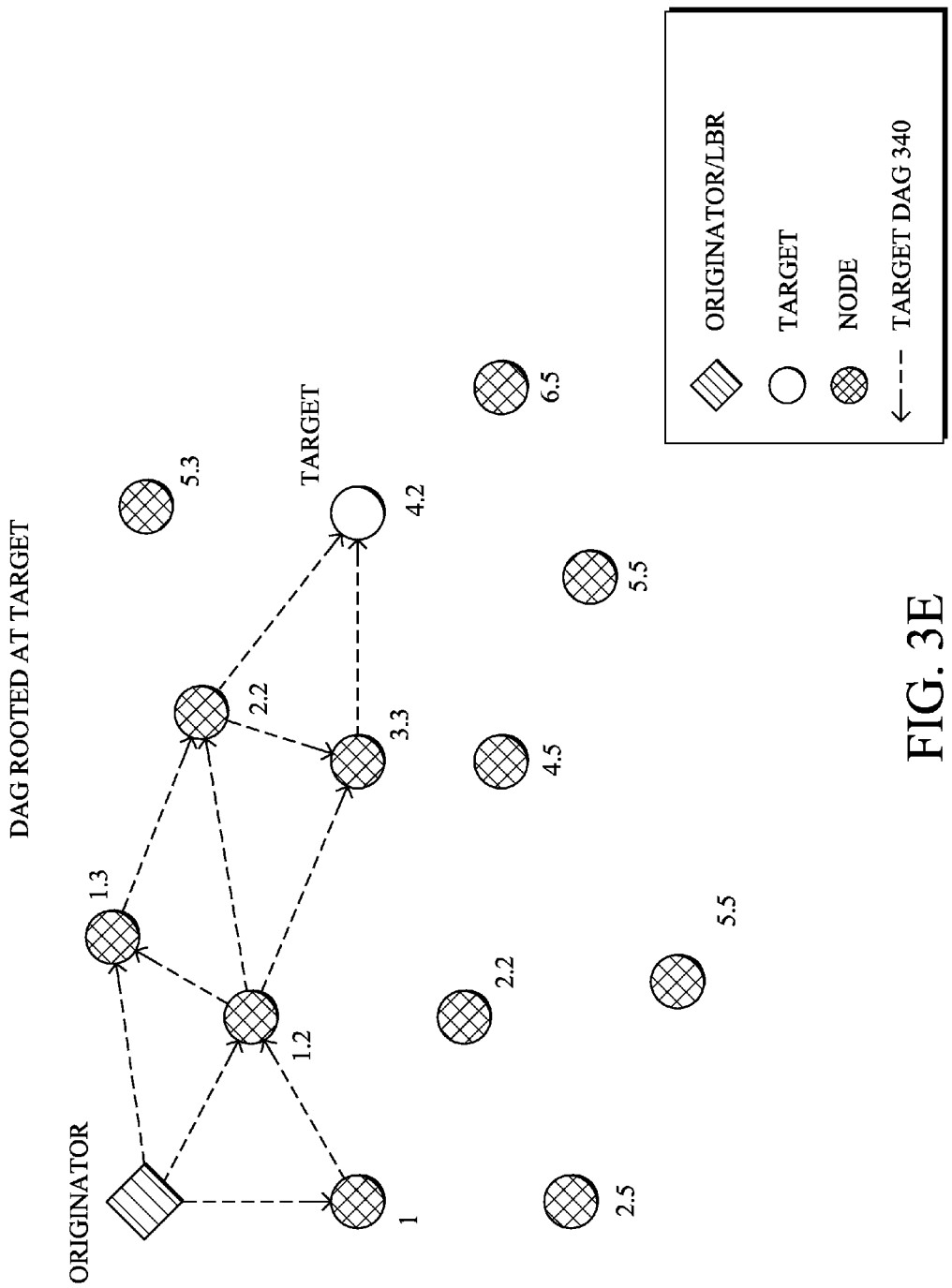
Figure 3F:
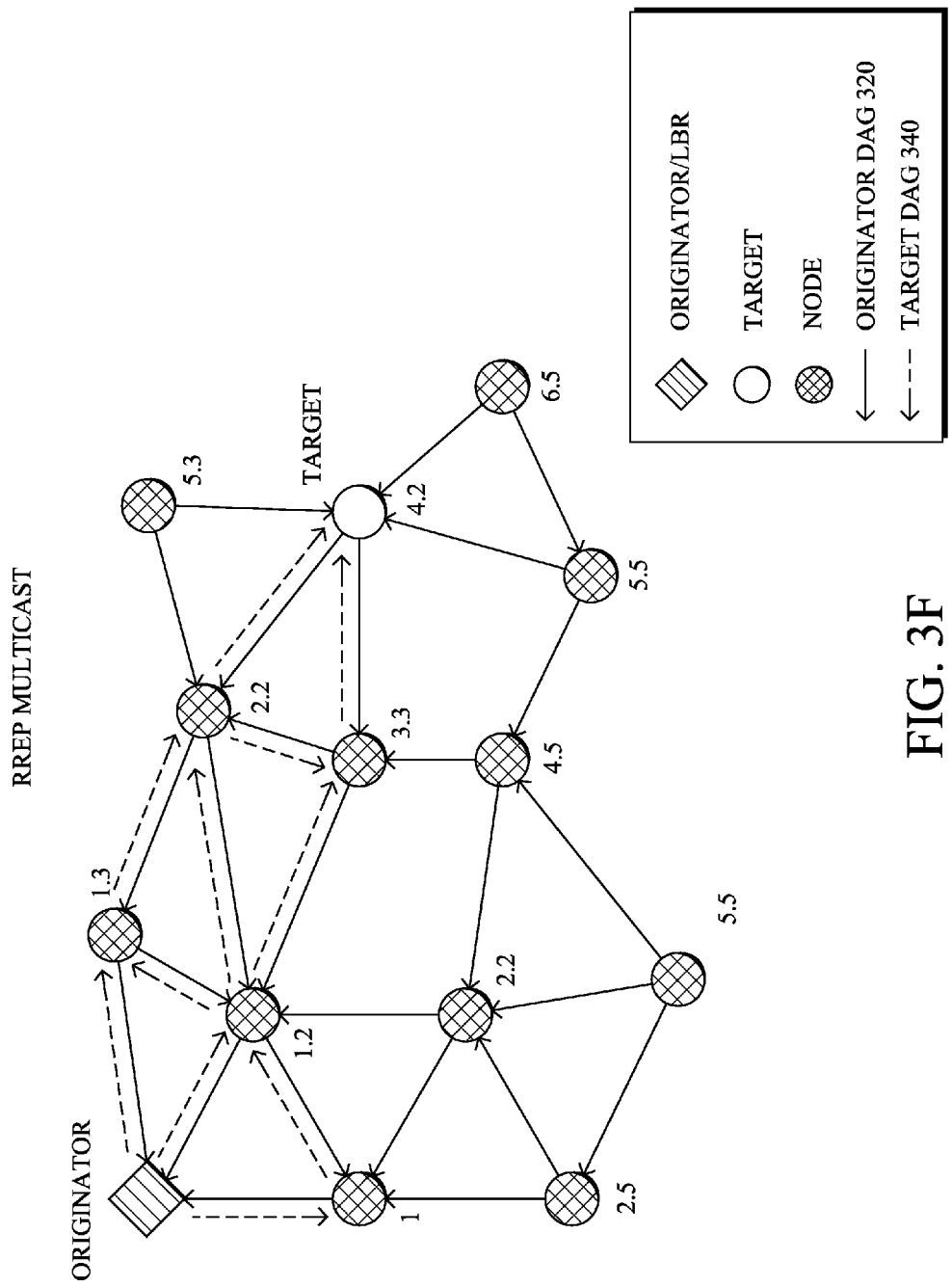

FIGS. 3D-3F illustrate a first example of the techniques herein, in which the target node may multicast a RREP to Originator DAG parents. As shown in FIG. 3D, each device may forward a RREP 330 by multicast to the parent nodes of the Originator DAG, where FIG. 3D illustrates the multicast propagation of the RREP message from the Target to the Originator. While forwarding the RREP message along the multicast tree, as shown in FIG. 3E, the nodes within the multicast tree may configure a route towards the Target. In other words, the multicast RREP may allow a second DAG 340 rooted at the Target—called the Target DAG (shown in FIG. 3E)—to be formed in the network. As shown in FIG. 3F, the end result is two overlapping DAGs: 1) the Originator DAG 320 formed by the broadcast RREQ messages, which provides routes from nodes in the network, including the Target, to the Originator, and 2) the Target DAG 340 formed by the multicast RREP messages, which provides routes from the Originator to Target. Illustratively, as shown in FIG. 3F, the Target DAG may be a link-reversal of a subset of the Originator DAG. As a result, the Target DAG may only use links that exist in the Originator DAG. Importantly, since nodes within the network have multiple next-hop destinations, they may maintain multiple routes towards the destination, which increases the overall robustness of the network.

Figure 3G:
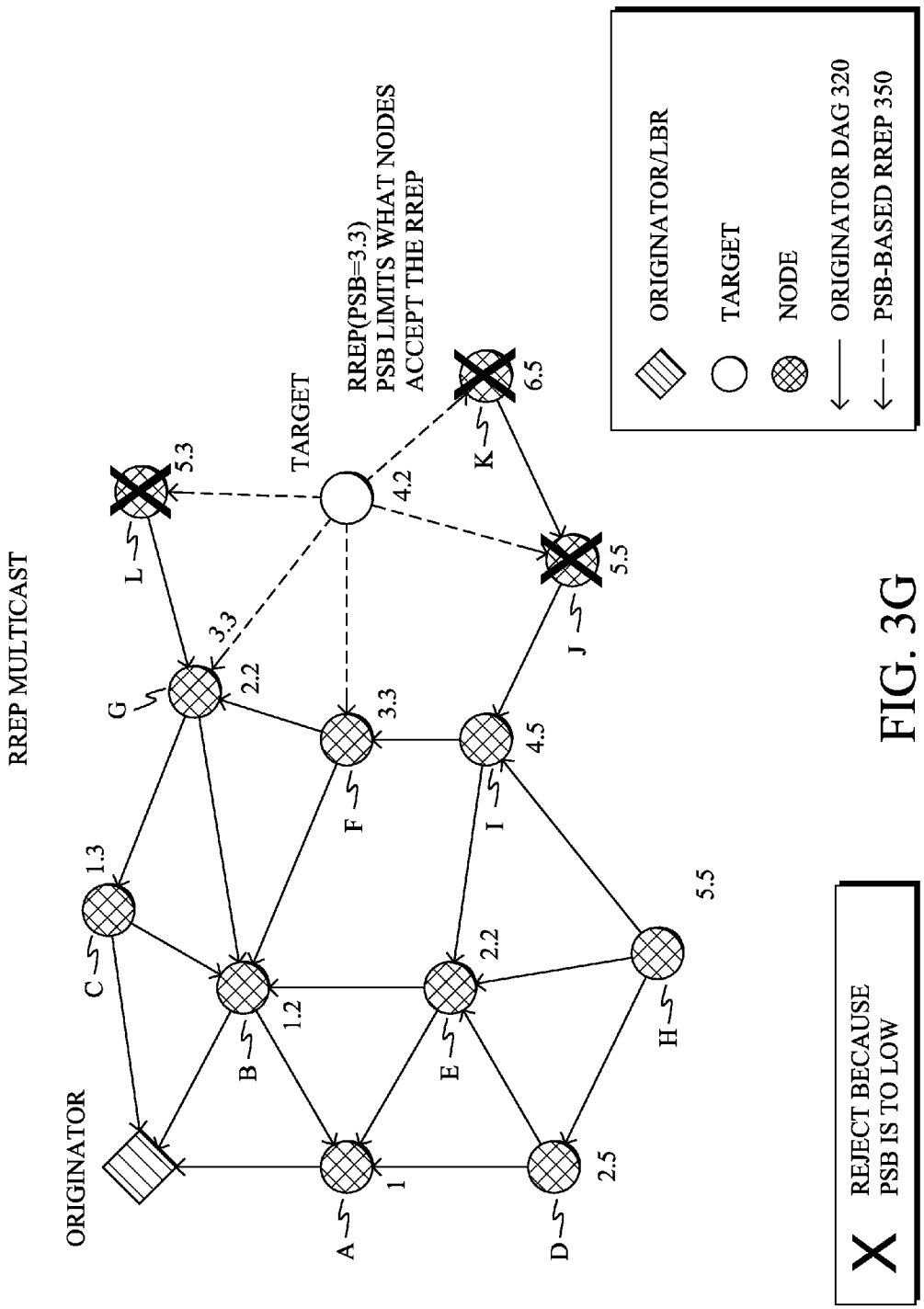

FIGS. 3G-3J illustrate another example of the techniques herein, in which a Path Search Bound (PSB) field/indicator may be included in the RREP, as mentioned above. For example, in FIG. 3G, a maximum path cost of Originator DAG parent nodes may be set by a RREP message sent from the Target by using a PSB field (illustratively set to 3.3) incorporated in the RREP message 350 (PSB-based RREP). Consequently, nodes within the network may only accept the RREP message 350 if they have a path cost (e.g., an estimated transmission (or retransmission) count (ETX)) less than or equal to the value of the PSB field. As shown in FIG. 3G, neighboring nodes F and G may accept the RREP message because they have a path cost/ETX of 3.3; however, neighboring nodes J, K, and L may reject the RREP message sent from the Target because their respective path cost/ETX values all exceed 3.3.

Figure 3H:
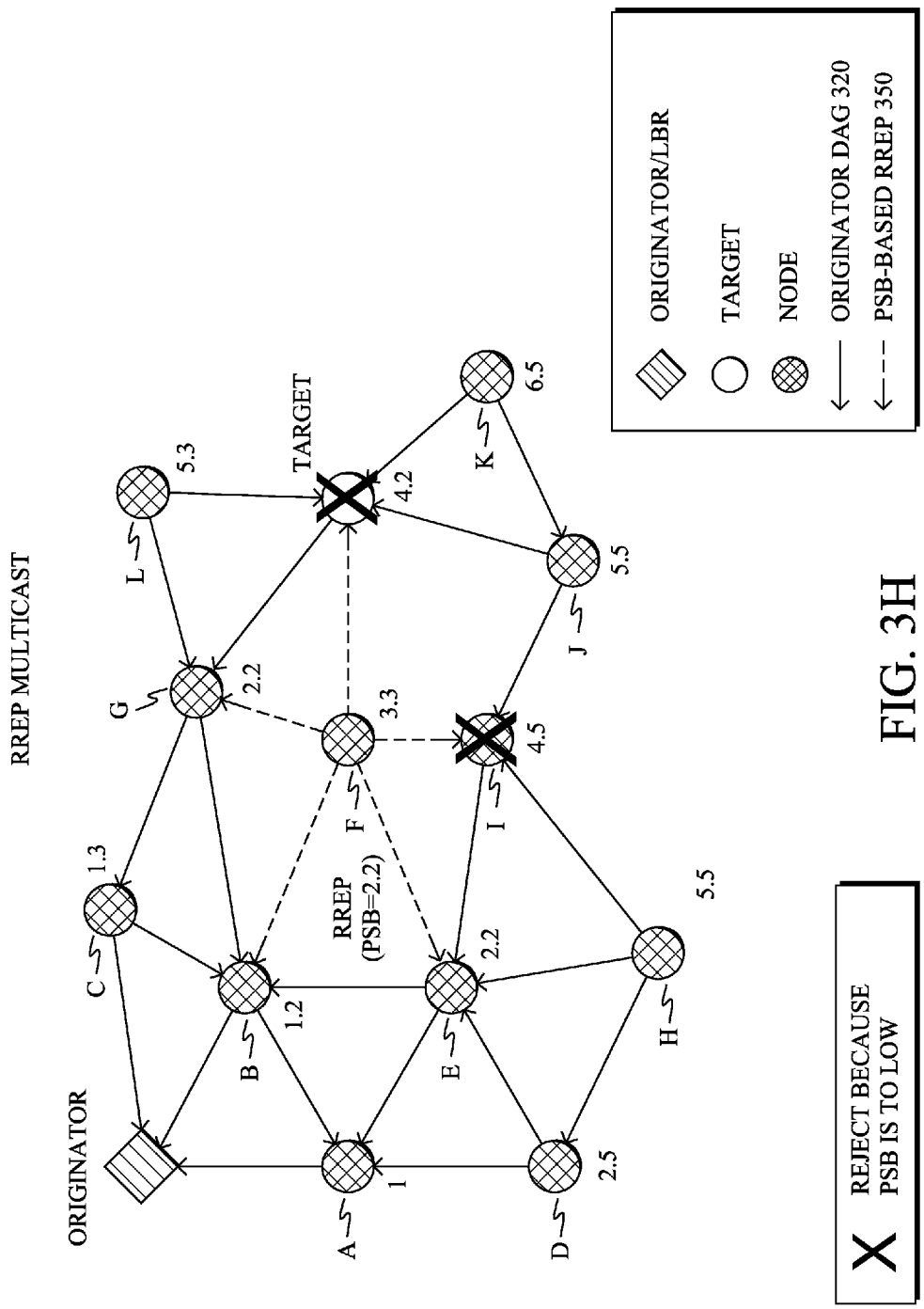
Figure 3I:
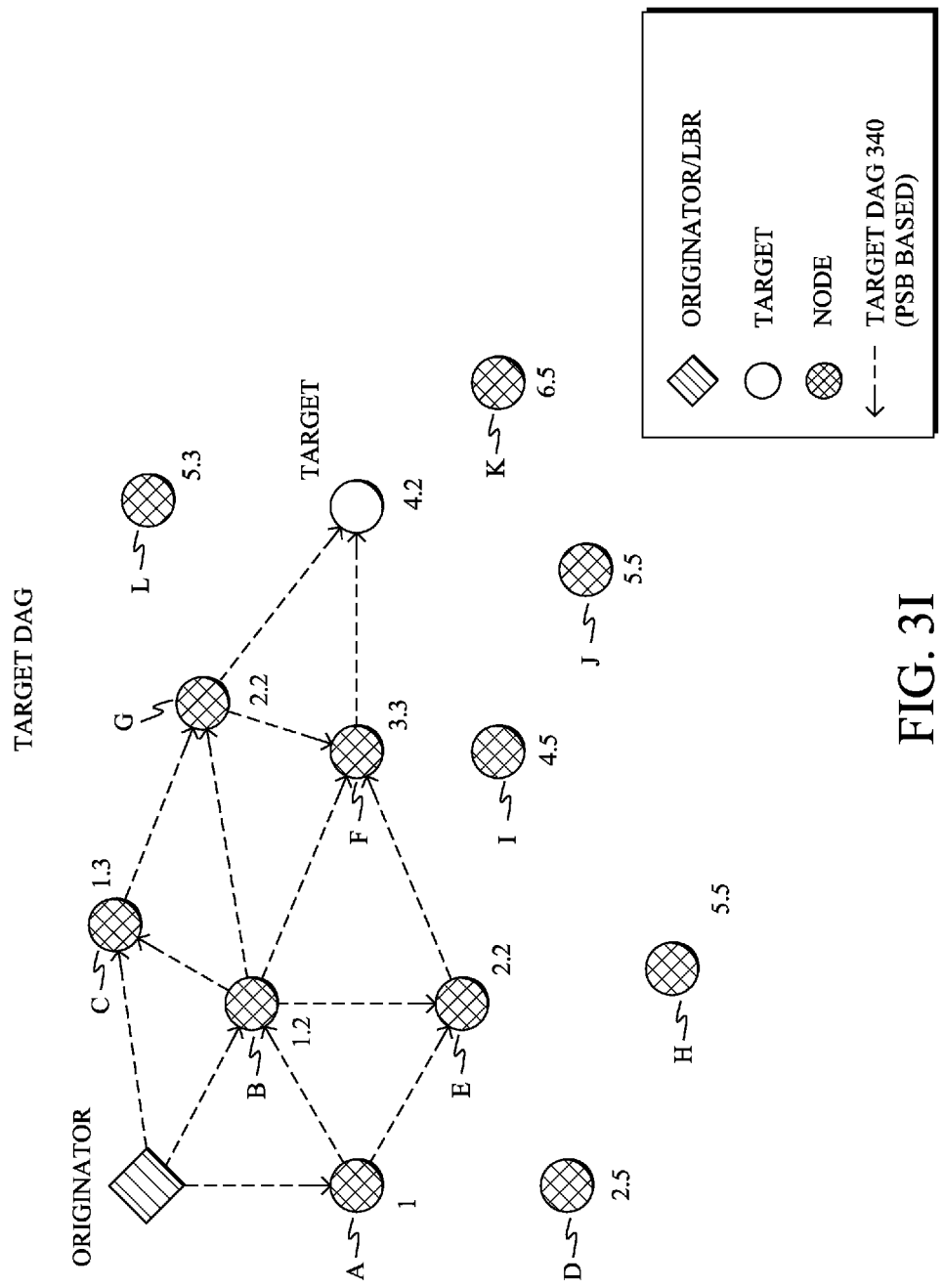

FIG. 3H illustrates another example in which node F sends a RREP 350 with a PSB field value of 2.2 that may be received/accepted by neighboring nodes B, E, and G, which have path cost/ETX values of 2.2 or less, but may not be received/accepted by neighboring node I or the Target, which have path cost/ETX values that exceed the PSB value of 2.2. As the RREP message is forwarded through the network, receiving devices may configure a route towards the Target, as shown in FIG. 3I, which may form a second DAG 340 rooted at Target, which is called the Target DAG (PSB-based). Note that as shown, the PSB may be dynamically adjusted at each node within the network, such as based on various factors including, but not limited to, number of neighbors, average path cost/ETX of neighbors, minimum/maximum/mean path cost/ETX of neighbors, manual configuration, signal-to-noise ratios (SNR), signal strength, distance to the Originator, and so on.

Figure 3J:
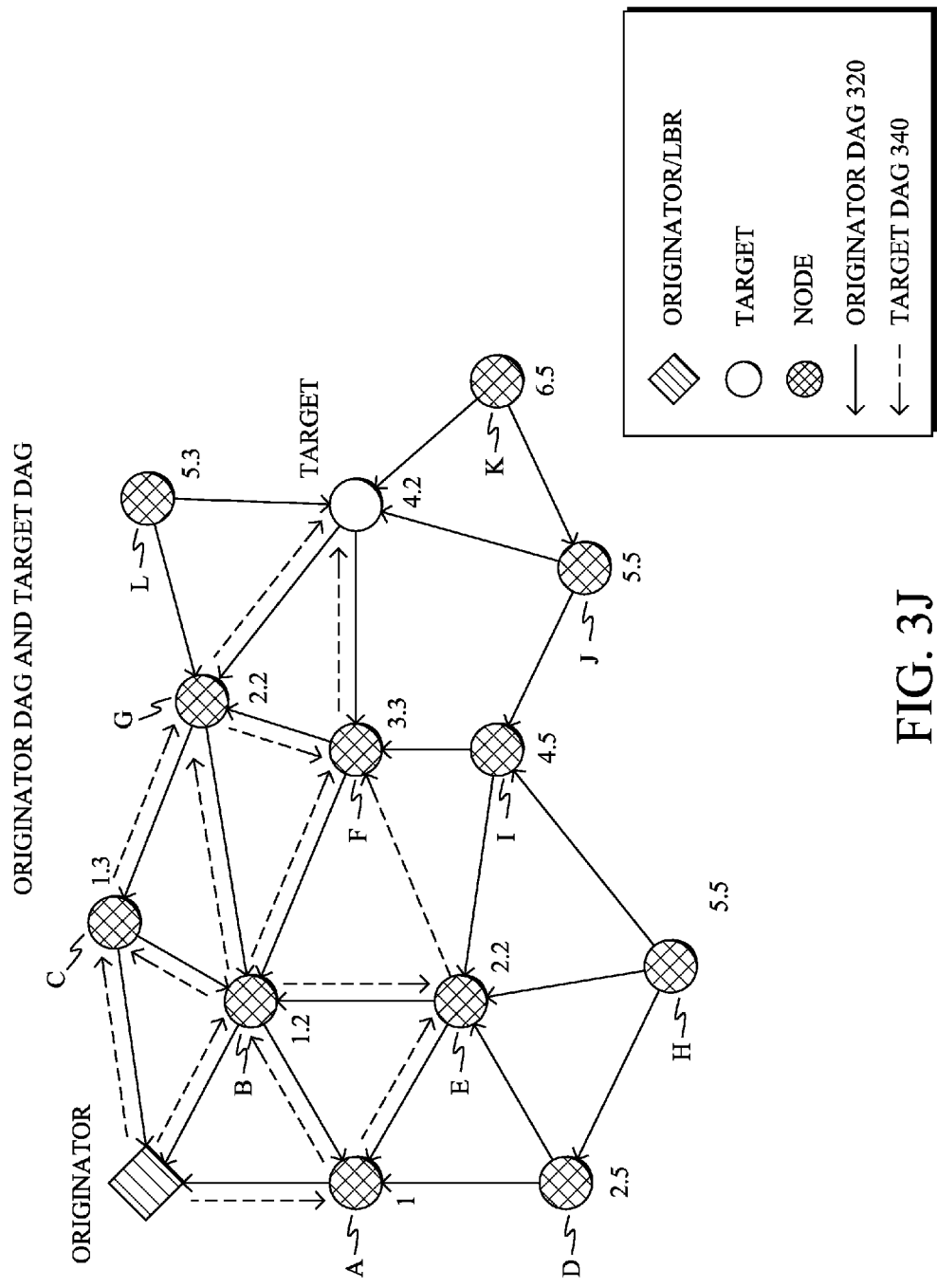

As shown in FIG. 3J, this may result in two DAGs: 1) an Originator DAG 320 formed by the RREQ messages, which provides routes from the Target to Originator, and 2) a Target DAG 340 formed by the returned RREP messages, which provides routes from the Originator to Target. However, unlike the example shown in FIGS. 3A-3F, here the Target DAG may use links that do not exist in the Originator DAG (e.g., the link between node E and node F). In other words, implementation of the PSB field in the RREP message may allow RREP messages to no longer be constrained to the Originator DAG topology. As noted above, the fact that nodes may have multiple next-hop destinations allows them to maintain multiple routes towards the destination, which increases overall robustness of the mesh.

Figure 4:
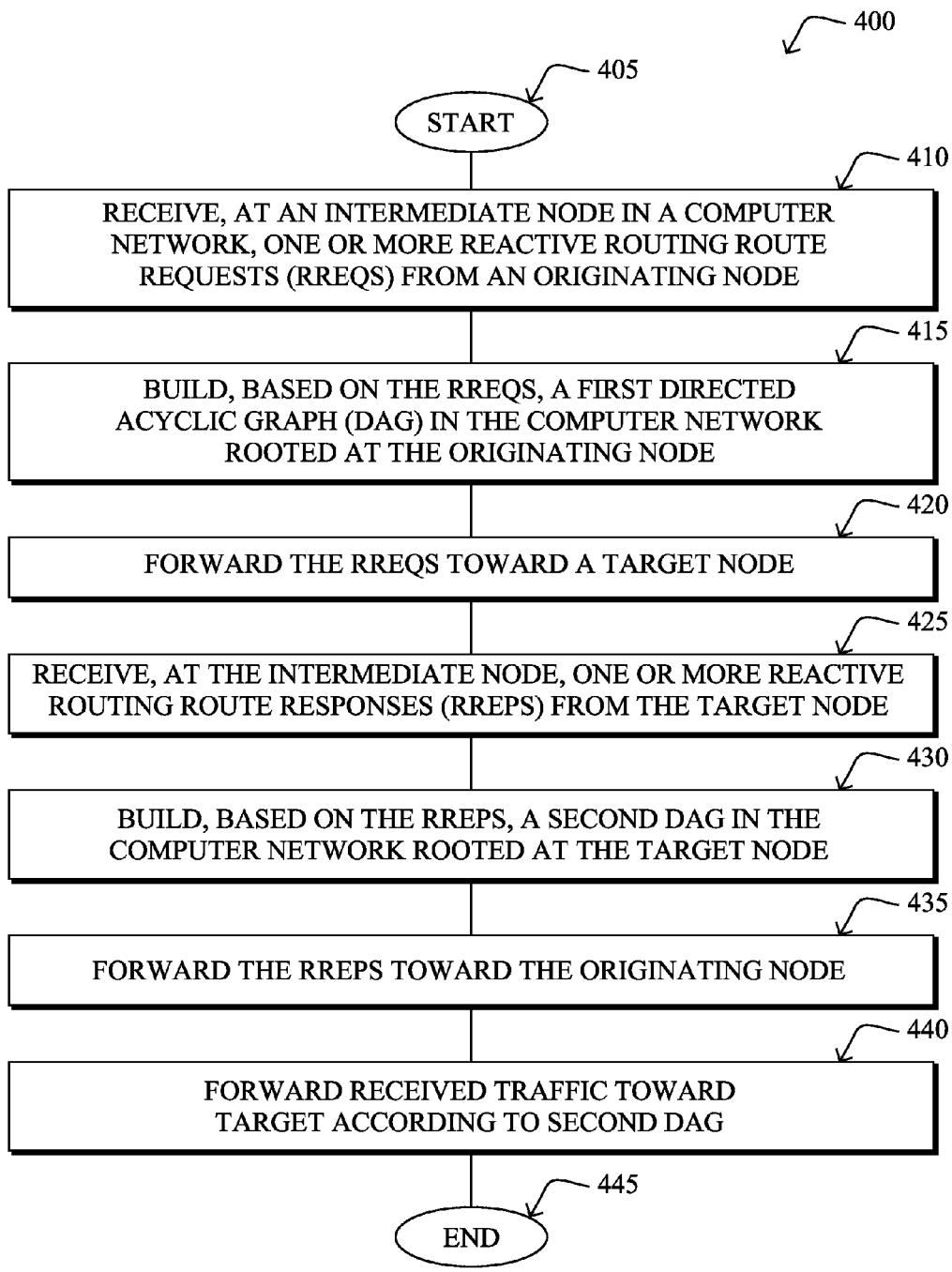
FIG. 4 illustrates an example simplified procedure for building directed acyclic graphs (DAGs) in a reactive routing network.

FIG. 4 illustrates an example simplified procedure 400 for proactive link-estimation in a reactive routing network in accordance with one or more embodiments described herein. The procedure 400 may start at step 405, and continue to step 410 where, as described above, an intermediate node in a computer network may receive one or more reactive routing route requests (RREQs) from an originating node. As shown in step 415, the intermediate node may then build, based on the RREQs, a first DAG in the computer network rooted at the originating node. The intermediate node may then forward, in step 420, the RREQs towards a target node. As shown in step 425, the intermediate node may then receive one or more reactive routing route replies (RREPs) from the target node. As shown in step 430, the intermediate node may then build, based on the RREPs, a second DAG in the computer network rooted at the target node. The intermediate node may then forward the RREPs towards the originating node, as shown in step 435. Consequently, in step 440, traffic (e.g., packets 140) received in the future may then be forwarded by the intermediate node according to the second DAG 340, where the second DAG provides one or more alternate routes to the target node, e.g., in the event of a failure (or to maintain the links of the second DAG as noted above), and then the procedure 400 may illustratively end in step 445, though notably with the option to return to any appropriate step described above based on the dynamicity of the DAG building process as detailed within the disclosure above.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide techniques for building DAGs within a reactive routing communication network. In particular, the techniques herein allow construction of two DAGs between a source-destination pair within a reactive routing communication network, where the first DAG may be rooted in the source and the second DAG may be routed in the destination. The techniques herein provide that the second DAG may overlap a subset of the links within the first DAG, while providing communication in the opposite direction (i.e., towards the source). The reciprocal DAGs (e.g., at least partially overlapping) may allow intermediate routers/nodes to maintain multiple next-hop routes towards both the source and destination devices, while increasing overall communication robustness and reducing the need to initiate a RREQ discovery flood. As described above, incorporation of a PSB field in a RREP may allow the construction and maintenance of reciprocal DAGs rooted at the two endpoints that are limited to the topological region between A and B rather, while avoiding the need to flood the entire network with RREQ messages. Additionally, the use of a PSB field in a RREP message may allow the second DAG to include links that are not present in the first DAG. In other words, rather than just having one or more end-to-end paths from a source to a destination, the techniques herein create reciprocal DAGs between the source and destination devices, which allow intermediate devices to have alternate routes (e.g., simply switching from one to another) to either the source or the destination that may avoid the possibility of a complete path failure. Existing reactive routing protocols that implement diverse paths may require a new RREQ flood in the event of complete failure of the diverse paths. In contrast, the techniques herein provide that failure of a primary network node may be overcome by simply selecting another intermediate node in the DAG as an alternate route.

While there have been shown and described illustrative embodiments of techniques for use with reactive routing in communication networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks, regardless of whether they are considered constrained. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, at an intermediate node in a computer network, one or more reactive routing route requests (RREQs) from an originating node;
    building, at the intermediate node based on the RREQs, a first directed acyclic graph (DAG) in the computer network rooted at the originating node;
    forwarding, at the intermediate node, the RREQs toward a target node;
    receiving, at the intermediate node, one or more reactive routing route replies (RREPs) from the target node;
    building, at the intermediate node based on the RREPs, a second DAG in the computer network rooted at the target node; and
    forwarding, at the intermediate node, the RREPs toward the originating node,
    wherein multiple next-hop routes are maintained towards both the originating node and the target node at the intermediate node.

2. The method as in claim 1, further comprising:
    forwarding traffic originated by the originating node toward the target node according to the second DAG, wherein the second DAG provides one or more alternate routes to the target node.

3. The method as in claim 1, wherein the RREPs are multicast from the target node to the originating node along one or more links in the first DAG.

4. The method as in claim 3, wherein the second DAG comprises a link-reversal of one or more links in the first DAG.

5. The method as in claim 4, wherein the one or more links comprise a subset of links in the first DAG.

6. The method as in claim 1, wherein the RREPs comprise a path search bound (PSB) indicator that directs the RREPs towards the originating node.

7. The method as in claim 6, further comprising:
    accepting a particular RREP only in response to an associated path-cost being less than or equal to the PSB indicator of the particular RREP.

8. The method as in claim 7, wherein the associated path-cost is one of either a cost to reach the originator or an estimated transmission count (ETX) to reach the originator.

9. The method as in claim 6, wherein the second DAG comprises links that are not present in the first DAG.

10. The method as in claim 6, further comprising:
    adjusting the PSB by the intermediate node when forwarding the RREPs toward the originating node.

11. The method as in claim 6, wherein the PSB is a value set by the target node.

12. The method as in claim 6, wherein the PSB is a value set on at least one of a per-class-of-service basis and a per-destination basis.

13. An apparatus, comprising:
    one or more network interfaces to communicate as a node in a communication network;
    a processor coupled to the network interfaces and adapted to execute one or more processes; and
    a memory configured to store a process executable by the processor, the process when executed operable to:
        receive one or more reactive routing requests (RREQs) from an originating node;
        build a first directed acyclic graph (DAG) in the computer network rooted at the originating node;
        forward the RREQs towards a target node;
        receive one or more reactive routing route replies (RREPs) from the target node;
        build a second DAG in the computer network rooted at the target node based on the RREPs; and
        forward the RREPs toward the originating node,
        wherein the apparatus is an intermediate node that maintains multiple next-hop routes towards both the originating node and the target node.

14. The apparatus as in claim 13, wherein the process when executed is further operable to:
    forward traffic originated by the originating node toward the target node according to the second DAG, wherein the second DAG provides one or more alternate routes to the target node.

15. The apparatus as in claim 13, wherein the process is configured to build the second DAG by multi-casting the RREP from the target node to the originating node along one or more links in the first DAG.

16. The apparatus as in claim 13, wherein the second DAG comprises a link-reversal of one or more links in the first DAG.

17. The apparatus as in claim 13, wherein the RREPs comprise a path search bound (PSB) indicator that directs the RREPs towards the originating node.

18. The apparatus as in claim 17, wherein the process when executed is further operable to:
 accept a particular RREP only in response to an associated path-cost being less than or equal to the PSB indicator of the particular RREP.

19. The apparatus as in claim 17, wherein the second DAG comprises links that are not present in the first DAG.

20. The apparatus as in claim 17, wherein the process when executed is further operable to:
 adjust the PSB when forwarding the RREPs toward the originating node.

21. A tangible, non-transitory, computer-readable media having software encoded thereon, the software when executed by a processor operable to:
 receive one or more reactive routing route requests (RREQs) from an originating node;
 build, at an intermediate node, a first directed acyclic graph (DAG) in the computer network rooted at the originating forward the RREQs towards a target node;
 receive one or more reactive routing route replies (RREPs) from the target node;
 build, at the intermediate node, a second DAG in the computer network rooted at the target node based on the RREPs; and
 forward the RREPs toward the originating node,
 wherein multiple next-hop routes are maintained towards both the originating node and the target node at the intermediate node.

22. The tangible, non-transitory, computer-readable medium as in claim 21, wherein the software when executed is further operable to:
 forward traffic originated by the originating node toward the target node according to the second DAG, wherein the second DAG provides one or more alternate routes to the target node.

* * * * *